United States Patent [19]

Chin

[11] Patent Number: 5,661,788
[45] Date of Patent: Aug. 26, 1997

[54] METHOD AND SYSTEM FOR SELECTIVELY ALERTING USER AND ANSWERING PREFERRED TELEPHONE CALLS

[75] Inventor: Seo-Yong Chin, Seongnam, Rep. of Korea

[73] Assignee: SamSung Electronics Co., Ltd., Suwon, Rep. of Korea

[21] Appl. No.: 590,749

[22] Filed: Jan. 24, 1996

[30] Foreign Application Priority Data

Jan. 25, 1995 [KR] Rep. of Korea ............... 1484/1995

[51] Int. Cl.$^6$ ............................................. H04M 3/42
[52] U.S. Cl. .............. 379/142; 379/67; 379/211; 379/373; 379/374; 379/376
[58] Field of Search ............... 379/67, 68, 89, 379/142, 127, 201, 207, 211, 373, 374, 376, 372, 350

[56] References Cited

U.S. PATENT DOCUMENTS

| | | | |
|---|---|---|---|
| 4,266,098 | 5/1981 | Novak | 379/142 |
| 4,672,660 | 6/1987 | Curtin | 379/88 |
| 4,894,861 | 1/1990 | Fujioka . | |
| 5,020,200 | 6/1991 | Hass et al. . | |
| 5,063,588 | 11/1991 | Patsiokas et al. | 379/88 |
| 5,070,521 | 12/1991 | Warner et al. . | |
| 5,121,423 | 6/1992 | Morihoro et al. | 379/142 |
| 5,220,599 | 6/1993 | Sassano et al. | 379/67 |
| 5,263,084 | 11/1993 | Chaput et al. . | |
| 5,265,145 | 11/1993 | Lim . | |
| 5,274,699 | 12/1993 | Ranz . | |
| 5,329,578 | 7/1994 | Brennan et al. | 379/201 |
| 5,349,638 | 9/1994 | Pitroda et al. . | |
| 5,388,150 | 2/1995 | Schneyer et al. . | |
| 5,394,445 | 2/1995 | Ball et al. . | |
| 5,408,528 | 4/1995 | Carlson et al. | 379/142 |
| 5,446,785 | 8/1995 | Hirai . | |
| 5,452,346 | 9/1995 | Miyamoto | 379/142 |
| 5,467,385 | 11/1995 | Reuben et al. . | |
| 5,473,671 | 12/1995 | Partridge, III . | |
| 5,481,594 | 1/1996 | Shen et al. . | |
| 5,490,205 | 2/1996 | Kondo et al. | 379/199 |
| 5,502,761 | 3/1996 | Duncan et al. | 379/142 |
| 5,511,111 | 4/1996 | Serbetcioglu et al. | 379/67 |
| 5,526,406 | 6/1996 | Luneau | 379/142 |

Primary Examiner—Krista M. Zele
Assistant Examiner—Scott Wolinsky
Attorney, Agent, or Firm—Robert E. Bushnell, Esq.

[57] ABSTRACT

A method and telephone system for selectively answering incoming telephone calls by enabling user selection of a receiving mode that designates telephone numbers and an alert mode that designates how the user will be notified of incoming calls from the designated telephone numbers, and then establishing an idle state. In response to receipt of an incoming call during the idle state, an outgoing message (OGM) requesting input of the calling party's telephone number is transmitted to the calling party. The calling party's telephone number is received as dual tone multi-frequency (DTMF) signals. The calling party's telephone number is then compared with telephone numbers designated within the selected receiving mode to determine whether the user should be notified of the incoming call. When the calling party's telephone number has been previously designated by the user within the selected receiving mode, the user is provided with an audible alert indicative of the incoming call according to the selected alert mode. The user is only notified of incoming calls originating from telephone numbers specified within the selected receiving mode. After the user receives the audible alert, a speech mode is established if the user answers the incoming call within a predetermined time period. If the incoming call is not answered by the user within the predetermined period of time, or the calling party's telephone number has not been previously designated by the user within the selected receiving mode, a call termination message is transmitted to the calling party to indicate that the user can not presently answer the incoming call.

17 Claims, 2 Drawing Sheets

METHOD AND SYSTEM FOR SELECTIVELY ALERTING USER AND ANSWERING PREFERRED TELEPHONE CALLS

CROSS-REFERENCE TO RELATED APPLICATIONS

This application makes reference to, incorporates the same herein, and claims all benefits accruing under 35 U.S.C. §119 from an application for *A Selective Incoming Call Answering Method In A Telephone System* earlier filed in the Korean Industrial Property Office on 25 Jan. 1995 and there assigned Ser. No. 1484/1995.

BACKGROUND OF THE INVENTION

The present invention relates to a method for selectively answering an incoming call in a telephone system, and more particularly, to a method in a portable telephone system in which when an incoming call from a prescribed calling party or telephone number is received, a called party receives an aural voice message indicating the calling party's telephone number or name so that the called party can selectively answer the incoming call.

As today's modern society places greater emphasis on the need for information, the degree in which the telephone is used has greatly increased. In view of this trend, as portable telephones have become popular, it has become increasingly common for individuals to carry their portable telephones with them everywhere they go in order to conduct business, or simply for convenience in receiving personal calls. Unfortunately, many users of portable telephones are frequently inconvenienced by telephone calls from solicitors, or other undesired calling parties. Accordingly, there has arisen the need for users of portable telephones, as well as users of general telephones, to be able to identify calling parties before they answer incoming calls.

One conventional method for selectively answering incoming telephone calls is disclosed in U.S. Pat. No. 5,446,785 entitled *Telephone Terminal Equipment In Which Telephone Numbers Of Callers Are Displayed* issued to Hirai. Hirai '785, a called party is provided with a display indicating the source of an incoming call. From this display, the called party can determine whether the incoming call is one that should be answered. While conventional art, such as Hirai '785, possesses merit in its own right, I believe that an improved system and method for avoiding undesired incoming telephone calls can be contemplated.

SUMMARY OF THE INVENTION

It is therefore an object of the present invention to provide an improved method for selectively answering incoming telephone calls.

It is another object to provide a method in a telephone system wherein, upon receipt of an incoming call from a designated telephone number, a called parry receives an aural voice message indicating a calling party's telephone number or name and can thereby selectively answer the incoming call.

It is still another object to provide a method for selectively answering incoming calls in which a user will only be notified as to the receipt of incoming calls from telephone numbers that he designates.

It is yet another object to provide a method for selectively answering incoming calls in which a user can select how he will be notified as to the receipt of incoming calls from telephone numbers that he designates.

To achieve these and other objects, the present invention provides a method for a telephone system including the steps of: enabling user selection of a receiving mode that designates telephone numbers and an alert mode that designates how the user will be notified of incoming calls from the designated telephone numbers, and then establishing an idle state. In response to receipt of an incoming call during the idle state, an outgoing message (OGM) requesting input of the calling party's telephone number is transmitted to the calling party. The calling party's telephone number is received as dual tone multi-frequency (DTMF) signals. The calling party's telephone number is then compared with telephone numbers designated within the selected receiving mode to determine whether the user should be notified of the incoming call. When the calling party's telephone number has been previously designated by the user within the selected receiving mode, the user is provided with an audible alert indicative of the incoming call according to the selected alert mode. The user is only notified of incoming calls originating from telephone numbers specified within the selected receiving mode. After the user receives the audible alert, a speech mode is established if the user answers the incoming call within a predetermined time period. If the incoming call is not answered by the user within the predetermined period of time, or the calling party's telephone number has not been previously designated by the user within the selected receiving mode, a call termination message is transmitted to the calling party to indicate that the user can not presently answer the incoming call.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
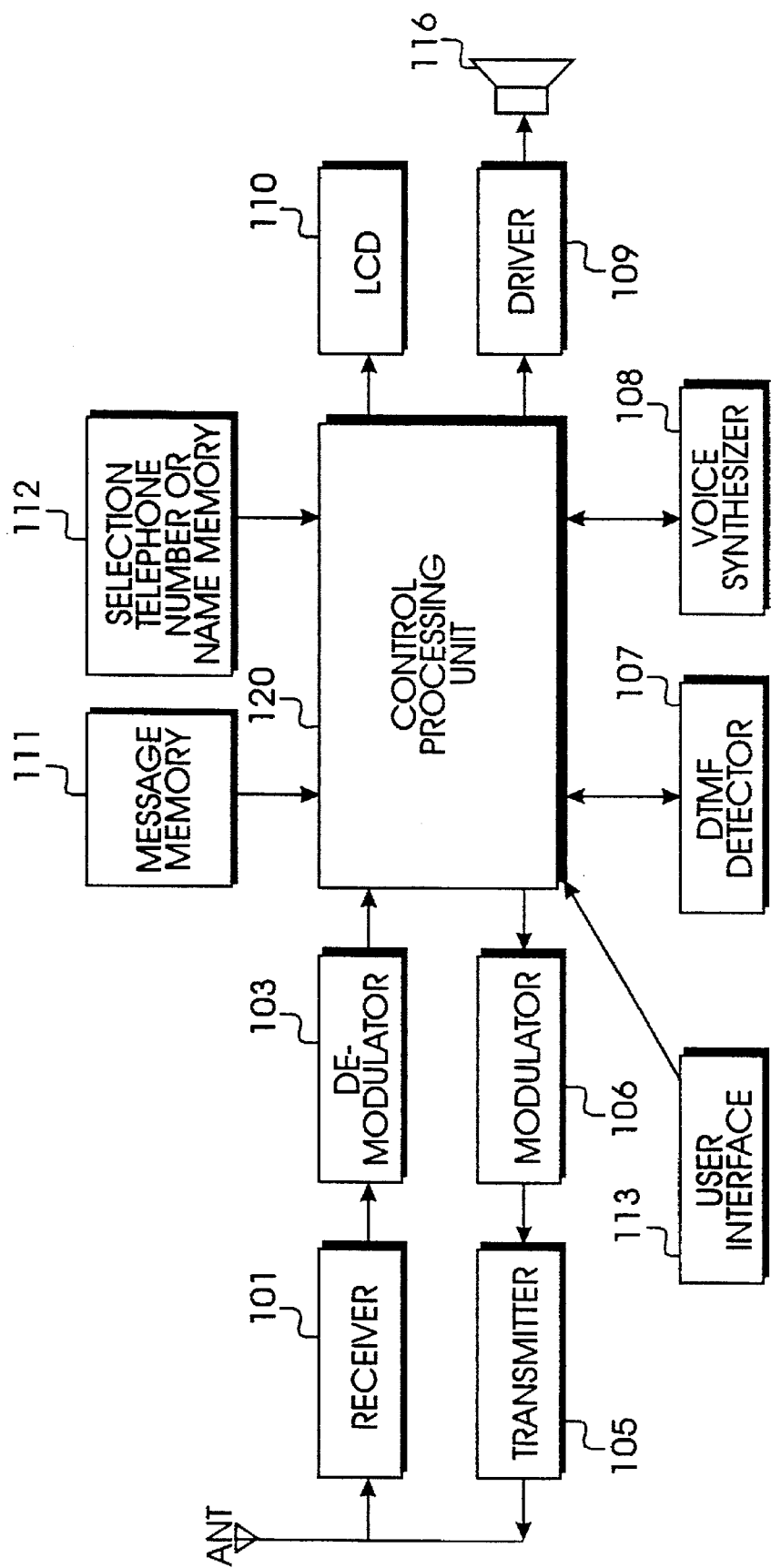
FIG. 1 is a circuit diagram illustrating a telephone system constructed according to a preferred embodiment of the present invention.

Turning now to the drawings and referring to FIG. 1, a telephone system constructed according to the preferred embodiment of the present invention is shown. The circuit diagram of FIG. 1 includes a receiver 101 for receiving incoming signals from a calling party via an antenna (ANT), and a demodulator 103 for demodulating the incoming signals and providing them to a central processing unit (CPU) 120. In response to central processing unit (CPU) 120 receiving the incoming signals, a message from a message memory 111 is transmitted to the calling party from antenna (ANT) via a modulator 106 and a transmitter 105. A dual tone multi-frequency (DTMF) detector 107 detects a dual tone multi-frequency (DTMF) signal transmitted from the calling party under the control of central processing unit (CPU) 120, and compares the detected signal with recorded content stored in a selection telephone number or name memory 112. A voice synthesizer 108 voice-synthesizes the calling party's telephone number or name detected by the comparison performed by dual tone multi-frequency DTMF detector 107, and enables output of a voice message indicating the calling party's telephone number or name through a speaker 116 driven by a driver 109, or enables display on a liquid crystal display (LCD) 110. A user interface 113 is provided to enable inputs from a user.

Figure 2:
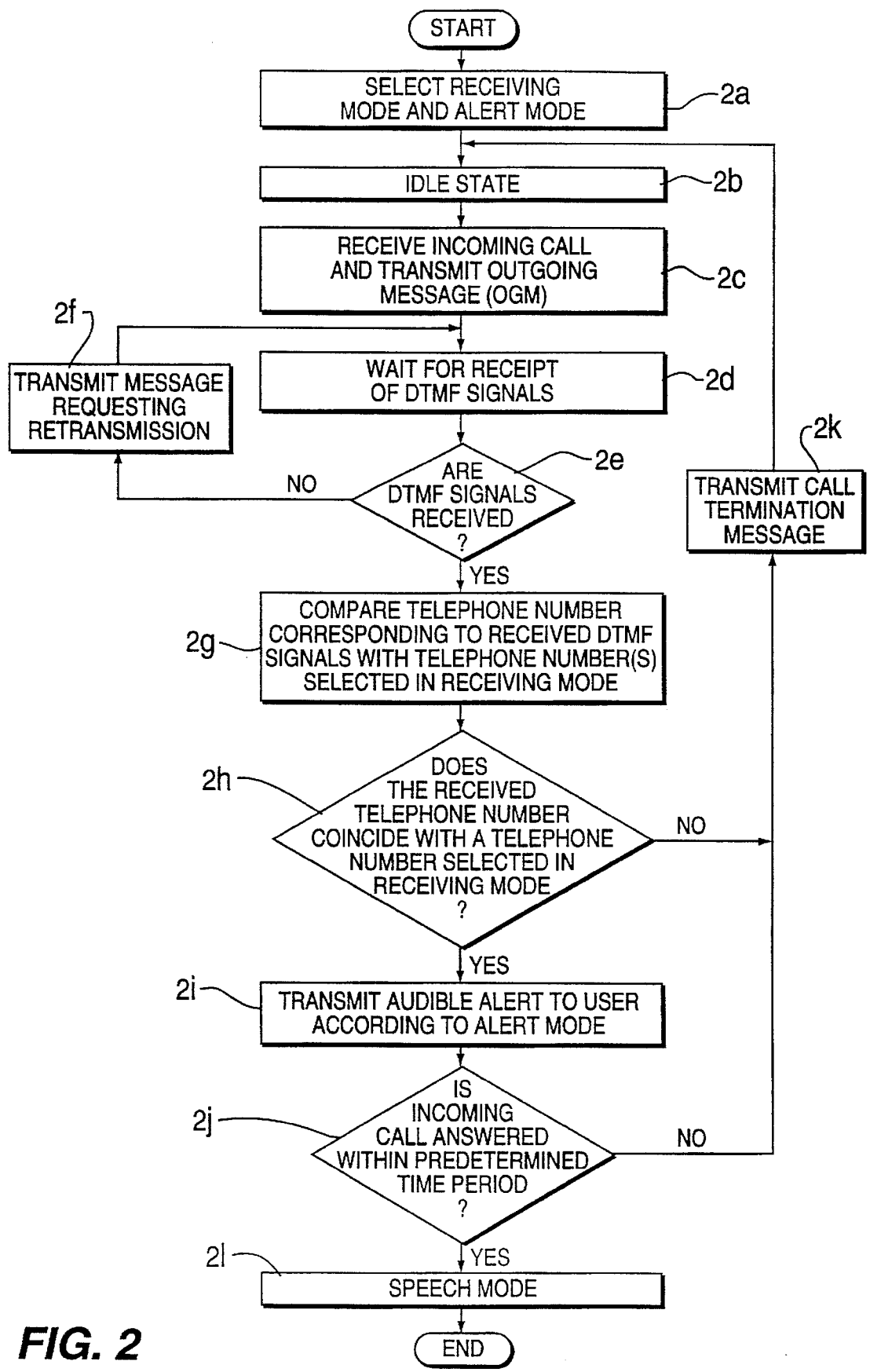
FIG. 2 is a is a flow chart illustrating the method for selectively answering an incoming telephone call according to the preferred embodiment of the present invention.

FIG. 2 is a flow chart illustrating the method for selectively answering an incoming telephone call according to the preferred embodiment of the present invention. Briefly, the method illustrated in FIG. 2 includes the steps of: enabling user selection of a receiving mode that designates telephone numbers and an alert mode that designates how the user will be notified of incoming calls from the designated telephone numbers, and then establishing an idle state. In response to receipt of an incoming call during the idle state, an outgoing message (OGM) requesting input of the calling party's telephone number is transmitted to the calling party. The calling party's telephone number is received as dual tone multi-frequency (DTMF) signals. The calling party's telephone number is then compared with telephone numbers designated within the selected receiving mode to determine whether the user should be notified of the incoming call. When the calling pasty's telephone number has been previously designated by the user (i.e., the called party) within the selected receiving mode, the user is provided with an audible alert indicative of the incoming call according to the selected alert mode. The user is only notified of incoming calls originating from telephone numbers designated within the selected receiving mode. After the user receives the audible alert, a speech mode is established if the user answers the incoming call within a predetermined time period. If the incoming call is not answered by the user within the predetermined period of time, or the calling party's telephone number has not been previously designated by the user within the selected receiving mode, a call termination message is transmitted to the calling party to indicate that the user can not presently answer the incoming call.

Accordingly, a detailed description of the preferred embodiment of the present invention will now be described with reference to FIGS. 1 and 2.

First, in step 2a, central processing unit (CPU) 120 enables user selection, via user interface 113, of a receiving mode and an alert mode. A receiving mode is selected to designate specific telephone numbers; the user will only be alerted to incoming telephone calls from these specific telephone numbers. Incoming calls from these telephones numbers can be thought of as "preferred calls". An alert mode is selected to designate how the user will be notified of incoming calls (i.e., preferred calls) from the telephone numbers included within the selected receiving mode. A receiving mode can be selected such that: (i) the user will be alerted to all incoming calls from all telephone numbers, (ii) the user will not be alerted to any incoming calls from any telephone number and calling parties will receive a message indicating that the user can not be presently contacted (i.e., this selection sets the telephone system to operate as an automatic answering device), (iii) the user will be alerted to incoming calls from all telephone numbers currently stored in memory 112, or (iv) user will be alerted to incoming calls only from specific telephone numbers within memory 112 that are selected by the user. An alert mode can be selected such that, upon receipt of an incoming call from a telephone number designated within the selected receiving mode: (i) the user will be provided with a ringing signal, (ii) the user will be provided with a ringing signal and a visual display of the telephone number of the calling party on liquid crystal display (LCD) 110, (iii) the user will be provided with an aural voice message indicating the telephone number of the calling party (e.g., "You are wanted on the telephone by a party calling from telephone number 123-4567"), or (iv) the user will be provided with an aural voice message indicating the name of the calling party (e.g., "You are wanted on the telephone by Mr. John Doe").

In other words, the user of the telephone system constructed according to the principles of the present invention can select a receiving mode and an alert mode, in step 2a, to comport with his or her current needs.

After the receiving and alert modes have been selected in step 2a, the telephone system advances to an idle state in step 2b. Next, in step 2c, an incoming call is received and central processing unit (CPU) 120 reads a pre-stored outgoing message (OGM) from message memory 111 for transmission to the calling party via modulator 106, transmitter 105 and antenna (ANT). The pre-stored outgoing message (OGM) requests the calling party to input his or her telephone number via the keypad on his or her telephone set. For example, the outgoing message (OGM) may state something such as, "Please input the digits of your telephone number after the tone".

After the outgoing message (OGM) is transmitted to the calling party in step 2c, central processing unit (CPU) 120 awaits receipt of dual tone multi-frequency (DTMF) signals corresponding to the calling party's telephone number through receiver 101 and demodulator 103, in step 2d. In step 2e, central processing unit (CPU) 120 determines whether dual tone multi-frequency (DTMF) signals corresponding to an input telephone number are received. If the dual tone multi-frequency (DTMF) signals are not received within a given interval in step 2e, central processing unit (CPU) 120 enables transmission of a message to the calling party requesting retransmission of his or her telephone number in step 2f, and then returns to step 2d.

Alternatively, if the dual tone multi-frequency (DTMF) signals are received in step 2e, central processing unit (CPU) 120 proceeds to step 2g and compares the telephone number corresponding to the received dual tone multi-frequency (DTMF) signals with the telephone number(s) designated within the selected receiving mode. Then, based on this comparison, central processing unit (CPU) 120 determines whether the received telephone number coincides with a telephone number designated within the selected receiving mode, in step 2h. That is, central processing unit (CPU) 120 determines whether the detected telephone number is memorized in selection telephone number or name memory 112 when option (iii) was selected as the receiving mode in step 2a. When the received telephone number coincides with a telephone number designated within the selected receiving mode, central processing unit (CPU) 120 transmits an audible alert to the user, in step 2i, in accordance with the alert mode selected by the user in step 2a.

After the audible alert is transmitted to the user in step 2i, central processing unit (CPU) 120 determines whether the user responds to the audible alert by answering the incoming call within a predetermined time period, in step 2j. If the user answers the incoming call within the predetermined time period in step 2j, a speech mode is established in step 2l and the user and the calling party may engage in a conversation.

However, if the received telephone number does not coincide with a telephone number designated within the selected receiving mode, in step 2h, or the user does not answer the incoming call within the predetermined time period, in step 2j, central processing unit (CPU) enables transmission of a pre-recorded call termination message to the calling party in step 2k, and then returns to the idle state. The call termination message notifies the calling party that the user is unable to answer the incoming call.

As set forth above, the present invention provides a method for enabling a user to selectively answer an incoming call in a telephone system. In particular, the present invention allows the user being called to be notified of an incoming call by providing a specified audible alert to the user when the telephone number of the calling party corresponds to a telephone number designated in a selected receiving mode.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A method for selectively answering incoming calls a telephone system, said method comprising the steps of:

selecting, in response to a first input from a user of said telephone system, a receiving mode to designate which of said incoming calls to said telephone system will represent preferred calls that the user wishes to answer, said receiving mode being selectable so that either none of said incoming calls will represent said preferred calls, said incoming calls originating from any telephone number stored in a memory of said telephone system will represent said preferred calls, or said incoming calls originating from only selected ones of said telephone numbers stored in said memory will represent said preferred calls;

selecting, in response to a second input from said user, an alert mode to designate how said user will be alerted to receipt of said preferred calls, said alert mode being selectable so that either said user will receive audible ringing signal in response to the receipt of said preferred calls, said user will receive said audible ringing signal and a visual display of a caller's telephone member in response to the receipt of said preferred calls, said user will receive a first audible voice message indicating said caller's telephone number in response to the receipt of said preferred calls, or said user will receive a second audible voice message indicating a caller's name in response to the receipt of said preferred calls;

establishing an idle state after said receiving mode and said alert mode have been selected;

receiving a first incoming call from a first calling party during said idle state, and providing, in response to receipt of said first incoming call, transmission of an outgoing message to said first calling party requesting said first calling party to input a telephone number corresponding to said first calling party;

receiving dual tone multi-frequency signals representative of said first telephone number corresponding to said first calling party, and determining, in response to receipt of said dual tone multi-frequency signals, whether said first incoming call represents one of said preferred calls;

alerting said user to the receipt of said first incoming call in accordance with said alert mode, when said first incoming call represents one of said preferred calls;

determining whether said user answers said first incoming call within a predetermined time period after said user is alerted to the receipt of said first incoming call; and transmitting a call termination message to said first calling party indicating that said user is unable to presently answer said first incoming call, when either said user does not answer said first incoming call within said predetermined time period after said user is alerted to the receipt of said first incoming call or said first incoming call does not represent one of said preferred calls.

2. The method as claimed in claim 1, wherein said user of said telephone system can further select said receiving mode so that all of said incoming calls represent said preferred calls.

3. The method as claimed in claim 1, wherein said user is not alerted to the receipt of said first incoming call, when said first incoming call does not represent one of said preferred calls.

4. The method as claimed in claim 3, wherein said user of said telephone system can further select said receiving mode so that all of said incoming calls represent said preferred calls.

5. A method for selectively answering incoming calls in a telephone system, said method comprising the steps of:

selecting a receiving mode in response to a first input provided from a user of said telephone system to designate which incoming calls to said telephone system will represent preferred calls that said user wishes to answer, said receiving mode being selectable so that either all of said incoming calls will represent said preferred calls, none of said incoming calls will represent said preferred calls, said incoming calls originating from any telephone number stored in a memory of said telephone system will represent said preferred calls, or said incoming calls originating from only selected ones of said telephone numbers stored in said memory will represent said preferred calls;

selecting an alert mode in response to a second input provided from said user to indicate a way in which said user will be alerted to receipt of said preferred calls, said alert mode being selectable so that either said user will receive an audible ringing signal in response to the receipt of said preferred calls, said user will receive said audible ringing signal and a visual display of a caller's telephone number in response to the receipt of said preferred calls, said user will receive a first audible voice message indicating said caller's telephone number in response to the receipt of said preferred calls, or said user will receive a second audible voice message indicating a caller's name in response to the receipt of said preferred calls;

receiving a first incoming call from a first calling party after said receiving mode and said alert mode have been selected, and providing, in response to receipt of said first incoming call, transmission of an outgoing message to said first calling party requesting said first calling party to input a first telephone number corresponding to said first calling party;

receiving dual tone multi-frequency signals representative of said first telephone number corresponding to said first calling party, and determining, in response to receipt of said dual tone multi-frequency signals, whether said first incoming call represents one of said preferred calls;

alerting said user to the receipt of said first incoming call in accordance with said alert mode, when said first incoming call represents one of said preferred calls;

determining whether said user answers said first incoming call within a predetermined time period after said user is alerted to the receipt of said first incoming call; and transmitting a call termination message to said first calling party indicating that said user is unable to presently answer said first incoming call, when either said user of said telephone system does not answer said first incoming call within said predetermined time period after said user is alerted to the receipt of said first incoming call or said first incoming call does not represent one of said preferred calls.

6. The method as claimed in claim 5, further comprised of establishing a speech mode to enable a conversation between said user and said first calling party when said user answers said first incoming call within said predetermined time period.

7. The method as claimed in claim 5, wherein said user is not alerted to the receipt of said first incoming call, when said first incoming call does not represent one of said preferred calls.

8. The method as claimed in claim 7, further comprised of establishing a speech mode to enable a conversation between said user and said first calling party when said user answers said first incoming call within said predetermined time period.

9. A method for selectively answering incoming calls in a telephone system, said method comprising the steps of:

selecting a receiving mode in response to a first input provided from a user of said telephone system to designate which incoming calls to said telephone system will represent preferred calls that said user wishes to answer, said receiving mode being selectable so that either all of said incoming calls will represent said preferred calls, none of said incoming calls will represent said preferred calls, said incoming calls originating from any telephone number stored in a memory of said telephone system will represent said preferred calls, or said incoming calls originating from only selected ones of said telephone numbers stored in said memory will represent said preferred calls;

selecting an alert mode in response to a second input provided from said user to indicate a way in which said user will be alerted to receipt of said preferred calls, said alert mode being selectable so that either said user will receive an audible ringing signal in response to the receipt of said preferred calls, said user will receive said audible ringing signal and a visual display of a caller's telephone number in response to the receipt of said preferred calls, said user will receive a first audible voice message indicating said caller's telephone number in response to the receipt of said preferred calls, or said user will receive a second audible voice message indicating a caller's name in response to the receipt of said preferred calls;

receiving a first incoming call from a first calling party after said receiving mode and said alert mode have been selected, and providing, in response to receipt of said first incoming call, transmission of an outgoing message to said first calling party requesting said said first calling party to input a first telephone number corresponding to said first calling party;

receiving dual tone multi-frequency signals representative of said first telephone number corresponding to said first calling party, and determining, in response to receipt of said dual tone multi-frequency signals, whether said first incoming call represents one of said preferred calls; and alerting said user to the receipt of said first incoming call in accordance with said alert mode, when said first incoming call represents one of said preferred calls.

10. The method as claimed in claim 9, further comprised of establishing a speech mode to enable a conversation between said user and said first calling party when said user answers said first incoming call within a predetermined time period after being alerted to the receipt of first incoming call.

11. The method as claimed in claim 9, wherein said user is not alerted to the receipt of said first incoming call, when said first incoming call does not represent one of said preferred calls.

12. The method as claimed in claim 11, further comprised of establishing a speech mode to enable a conversation between said user and said first calling party when said user answers said first incoming within a predetermined time period after being alerted to the receipt of said first incoming call.

13. A telephone system, comprising:

input means for enabling user inputs to select a receiving mode to designate which incoming calls to said telephone system will represent preferred calls that the user wishes to answer, and an alert mode to indicate a manner in which the user will be alerted to receipt of said preferred calls, said receiving mode being selectable so that either all of said incoming calls will represent said preferred calls, none of said incoming calls will represent said preferred calls, said incoming calls originating from any telephone number stored in a memory of said telephone system will represent said preferred calls, or said incoming calls originating from only selected ones of said telephone numbers stored in said memory will represent said preferred calls, said alert mode being selectable so that either the user will receive an audible ringing signal in response to the receipt of said preferred calls, the user will receive said audible ringing signal and a visual display of a caller's telephone number in response to the receipt of said preferred calls, the user will receive a first audible voice message indicating a caller's telephone number in response to the receipt of said preferred calls, or the user will receive a second audible voice message indicating a caller's name in response to the receipt of said preferred calls; and processing means for enabling transmission of an outgoing message to a first calling party requesting the first calling party to input a first telephone number corresponding to the first calling party in response to receipt of a first incoming call, receiving dual tone multi-frequency signals representative of said first telephone number corresponding to the first calling party, determining whether said first incoming call represents one of said preferred calls in response to receipt of said dual tone multi-frequency signals, and alerting the user to the receipt of said first incoming call in accordance with said alert mode when said first incoming call represents one of said preferred calls.

14. The telephone system as claimed in claim 13, wherein said processing means enables a conversation between the user and the first calling party when the user answers said first incoming call within a predetermined time period after being alerted to the receipt of said first incoming call.

15. The telephone system as claimed in claim 13, wherein the user is not alerted to the receipt of said first incoming call, when said first incoming call does not represent one of said preferred calls.

16. The telephone system as claimed in claim 15, wherein said processing means enables a conversation between the user and the first calling party when the user answers said first incoming call within a predetermined time period after being alerted to the receipt of said first incoming call.

17. The telephone system as claimed in claim 16, wherein said processing means enables transmission of a call termination message to the first calling party indicating the user is unable to answer said first incoming call, when either the user of said telephone system does not answer said first incoming call within said predetermined time period after being alerted to the receipt of said first incoming call or said first incoming call does not represent one of said preferred calls.

* * * * *